United States Patent [19]
Kenwright

[11] Patent Number: 5,191,684
[45] Date of Patent: Mar. 9, 1993

[54] CLAMP STRUCTURE

[75] Inventor: Eric T. Kenwright, Creemore, Canada

[73] Assignee: Hans Oetiker AG Maschinen- und Apparatefabrik, Horgen, Switzerland

[21] Appl. No.: 789,671

[22] Filed: Nov. 8, 1991

[51] Int. Cl.[5] ............................................ B65D 63/00
[52] U.S. Cl. ................................ 24/20 R; 24/20 CW; 24/20 TT
[58] Field of Search .............. 24/20 R, 20 CW, 20 W, 24/20 TT, 20 EE, 22, 23 EE, 279, 280, 274, 278

[56]            References Cited
         U.S. PATENT DOCUMENTS

| | | | |
|---|---|---|---|
| 3,358,351 | 12/1967 | Ott | 24/23 EE |
| 4,299,012 | 11/1981 | Oetiker | 24/20 CW |
| 4,315,348 | 2/1982 | Oetiker | 24/20 CW |
| 4,468,840 | 9/1984 | Sauer et al. | 24/20 R |
| 4,492,004 | 1/1985 | Oetiker | 24/20 R |
| 4,712,278 | 12/1987 | Oetiker | 24/20 TT |
| 4,914,788 | 4/1990 | Ojima | 24/20 R |
| 4,987,651 | 1/1991 | Oetiker | 24/20 R |

Primary Examiner—Victor N. Sakran
Attorney, Agent, or Firm—Paul M. Craig, Jr.

[57]                ABSTRACT

An open clamp structure, especially an earless clamp structure with overlapping inner and outer clamping band portions adapted to be mechanically interconnected; the clamp structure can be tightened about the object to be fastened by the application of a tightening tool at tool-engaging surfaces in these band portions; the tool-engaging surfaces are thereby so constructed and arranged that over-torquing during tightening is precluded. Savings in band material can be realized by the particular arrangement of the mechanical connection of the inner and outer band portions which also permits an efficient preassembly.

33 Claims, 2 Drawing Sheets

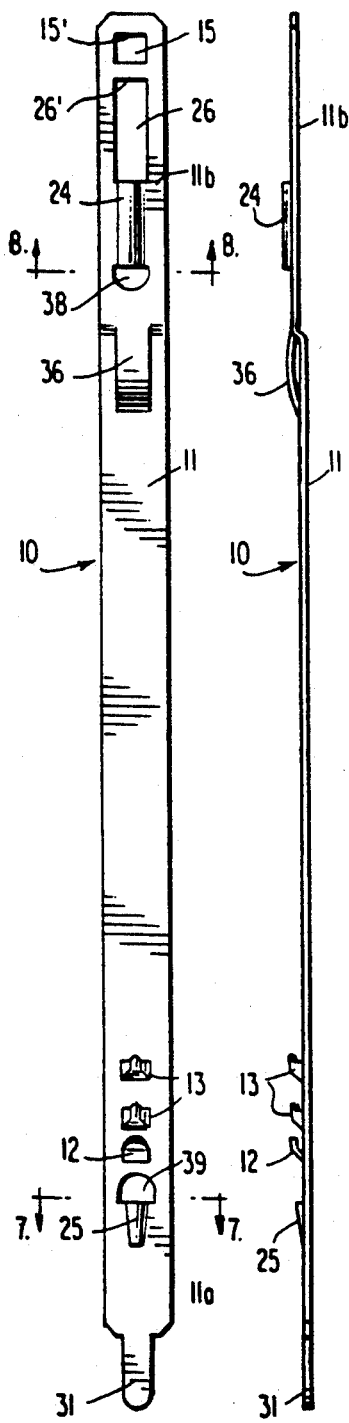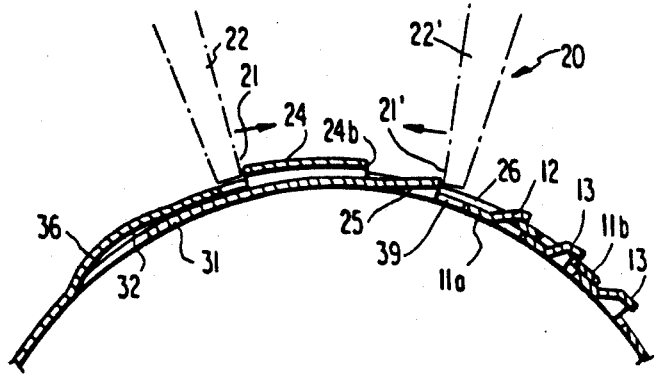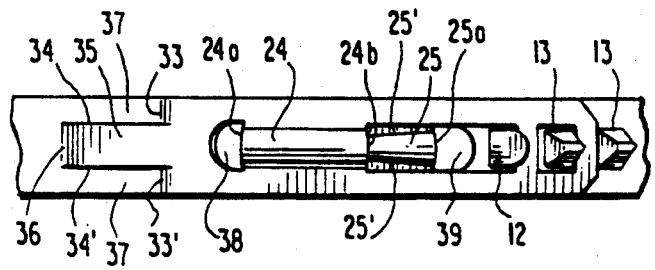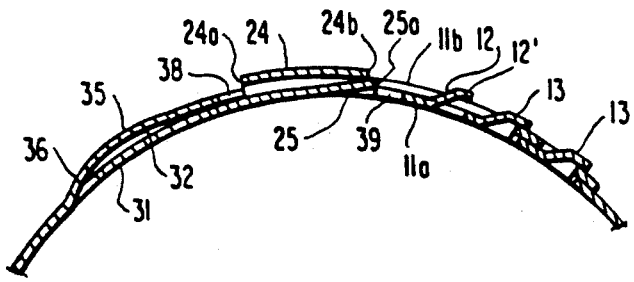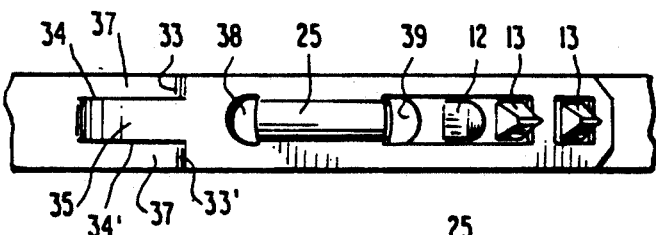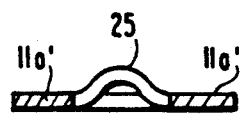

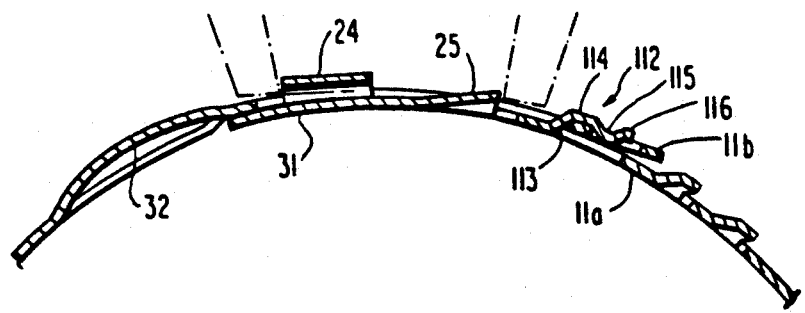
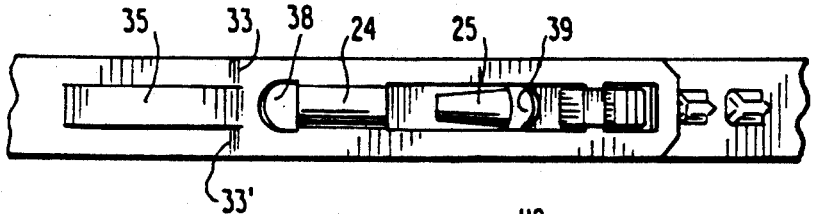
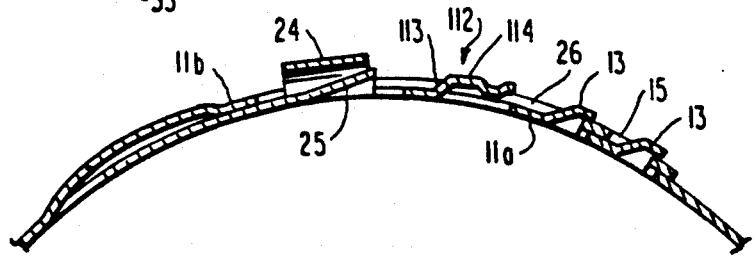
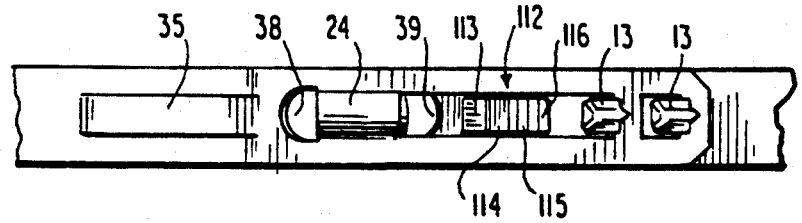
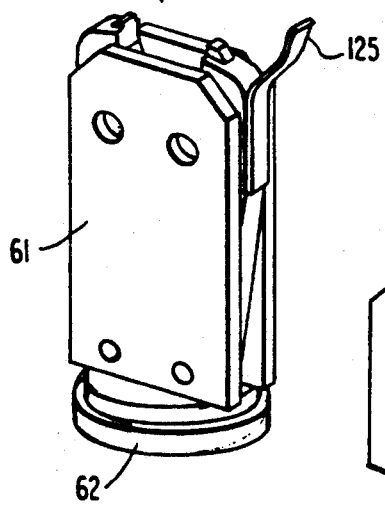
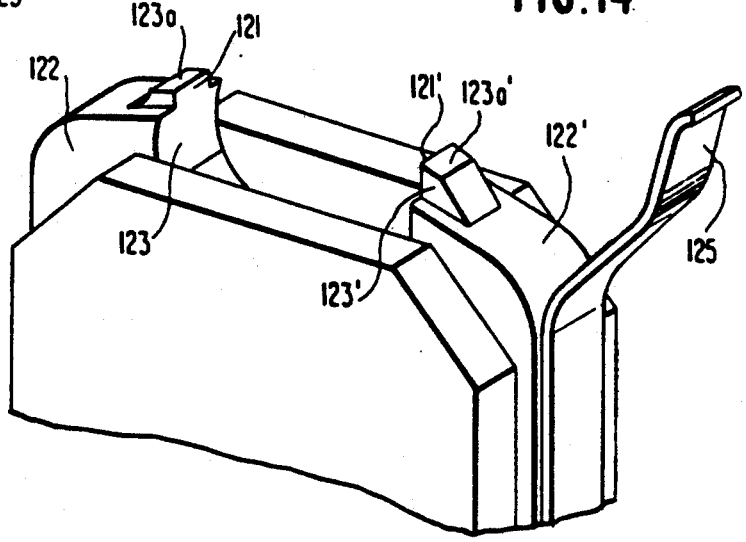

CLAMP STRUCTURE

FIELD OF INVENTION

The present invention relates to a clamp structure, and more particularly to a so-called earless clamp structure.

BACKGROUND OF THE INVENTION

Earless clamp structures are known in the prior art, for example, as described in the U.S. Pat. No. 4,492,004 in which outwardly bent hooks in the inner band portion are adapted to engage in apertures in the outer band portion as the clamp is tightened about the object to be fastened thereby by engagement of a tool at tool-engaging abutment surfaces in the clamping band. These prior art earless clamp structures also include means to assure an internal clamping surface devoid of discontinuities, steps or gaps by the use of a tongue-like extension in the inner band portion adapted to engage in a tongue-receiving channel in the outer band portion. Tightening of the clamp structure is thereby achieved by the use of a pincer-like tool with mutually facing engaging points adapted to engage in the openings formed in substantially semi-cylindrically shaped tool-engaging embossments providing the transversely extending tool-engaging abutment surfaces in the inner and outer band portions. This U.S. Pat. No. 4,492,004 also describes the use of an approximately L-shaped preassembly hook which was subsequently improved to provide a snap-in preassembly hook arrangement as described in U.S. patent application Serial No. 06/942,694, filed Dec. 22, 1986, and entitled "Clamp Structure With Preassembly Arrangement."

The aforementioned type of earless clamp structures have proved immensely successful from a commercial point of view. To avoid the need for special pincer-like tightening tools with mutually facing points that are likely to meet with substantial wear and tear, a modified earless clamp structure has been proposed in U.S. Pat. No. 4,712,278 in which the tool-engaging surfaces for the tightening tool were so constructed and arranged by the use of bent-out tab-like members that a tool with flat surfaces could be used.

One problem that arose with all of the aforementioned types of earless clamp structures was the possibility of over-torquing the clamp during tightening thereof, i.e., excessive tightening of the clamp which could result in damage to parts of the clamp structure.

SUMMARY OF THE INVENTION

The present invention is concerned with eliminating the drawbacks encountered with the prior art construction and to effectively prevent over-torquing of the clamp structure during tightening thereof. The underlying problems are solved in accordance with the present invention in that a conventional tool with flat engaging surfaces can be used and in that the tool-engaging abutment surfaces are so located in the clamp structure that tightening only up to a predetermined point is possible which corresponds to the predetermined tightened condition in which the hook-like members in the inner band portion can engage in the apertures in the outer band portion. As earless type clamps of the aforementioned type are designed for a specific diametric dimension, over-torquing is prevented according to the present invention by so locating the tool-engaging abutment surface in the inner band portion that it will be substantially flush with the end of the tunnel-like embossment in the outer band portion on the side opposite the tool-engaging abutment surface thereof. As the tool-engaging embossment in the inner band portion is of such shape that it can slide underneath the tunnel-like tool-engaging embossment in the outer band portion, over-torquing is prevented because further tightening of the clamp structure is precluded when the engaging surface in the tool, normally in engagement with the tool-engaging abutment surface in the inner band portion, also comes into abutment at the tool-engaging abutment surface in the tunnel-like embossment in the outer band portion at the end thereof opposite its side where the other jaw of the tool applies tightening forces. In other words, maximum tightening or torquing of the clamp is limited when the engaging surfaces of both jaws of the tightening tool, in effect, abut at the two ends of the tunnel-like embossment. This occurs precisely when the mechanical connection between the inner and outer band portions consisting of outwardly extending hooks in the inner band portion and apertures in the outer band portion reach position in which engagement of the hook-like members in the apertures becomes possible. This corresponds therefore also to the condition in which the surface of the tightening tool in engagement with the tool abutment surface in the inner band portion has reached its limit travel by engagement with the corresponding abutment surface in the tunnel-like outer tool-engaging embossment in the outer band portion.

According to another feature of the present invention, damage to the clamp structure by tearing or the like is minimized by increasing the length of the tunnel-like tool-engaging embossment in the outer band portion, by an improved design of the tool-engaging embossment in the inner band portion and by improved cross-sectional shapes of the tool-engaging embossments in the inner and outer band portions as viewed in a transverse cross section, providing greater strength and lower height to decrease the effective lever arms.

Furthermore, to permit the use of conventional pliers, such as flat-nosed pliers or long-nosed pliers with flat, mutually facing engaging surfaces, according to still a further feature of the present invention, apertures are provided in the respective band portions adjacent the normal tool-engaging abutment surfaces thereof which have a maximum width greater than the maximum width of the tool-engaging abutment surfaces so that the tips of pliers can extend into these apertures to engage also with lateral band portions exposed by these openings, thereby adding to resistance against tearing.

According to still another feature of the present invention, a saving in material is attained by utilizing a number of apertures in the outer band portions which is less than the number of hook-like members in the inner band portion so that the length of the clamp structure can be reduced and therewith band material can be saved.

Accordingly, it is an object of the present invention to provide a clamp structure of the type described above which eliminates the aforementioned shortcomings and drawbacks encountered in the prior art.

Another object of the present invention resides in a clamp structure, especially earless clamp structure in which over-torquing during tightening of the clamp is effectively precluded.

A further object of the present invention resides in a clamp structure which exhibits greater strength and resistance to tearing damage, yet permits savings in band material.

A still further object of the present invention resides in a clamp structure, especially earless clamp structure in which tightening can be realized by the use of conventional plier-like tools.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 1 is a top plan view on an earless clamp structure in accordance with the present invention in flat condition as stamped out;

FIG. 2 is a side elevational view of the clamp structure of FIG. 1;

FIG. 3 is a partial cross-sectional view of a clamp structure in accordance with the present invention with the parts thereof in the preassembled condition;

FIG. 4 is a partial top plan view on the clamp structure of FIG. 3;

FIG. 5 is a partial cross-sectional view, similar to FIG. 3, showing the parts of the clamp structure in the tightened installed condition;

FIG. 6 is a partial plan view on the clamp structure of FIG. 5;

FIG. 7 is a cross-sectional view, on an enlarged scale, taken along line 7—7 of FIG. 1;

FIG. 8 is a cross-sectional view, on an enlarged scale, taken along line 8—8 of FIG. 1;

FIG. 9 is a partial cross-sectional view, similar to FIG. 3, and illustrating a modified embodiment of a clamp structure in accordance with the present invention with a snap-in type preassembly hook, showing the parts thereof in the preassembled condition;

FIG. 10 is a partial plan view on the clamp structure of FIG. 9;

FIG. 11 is a cross-sectional view, similar to FIG. 9, and illustrating the parts thereof in the tightened condition of the installed clamp;

FIG. 12 is a partial top plan view on the clamp structure of FIG. 11;

FIG. 13 is a perspective view of a pneumatic tightening tool use with the present invention; and FIG. 14 is a partial perspective view, on an enlarged scale, of the pneumatic tightening tool head of FIG. 13.

DETAILED DESCRIPTION OF THE DRAWINGS

Referring now to the drawing wherein like reference numerals are used throughout the various views to designate like parts, and more particularly to FIGS. 1–8, reference numeral 10 generally designates the earless clamp structure in accordance with the present invention which includes a clamping band 11 having inner and outer overlapping band portions 11a and 11b as the clamp is mounted over the object to be fastened thereby such as a hose to be fastened on a nipple or the like. The mechanical connection between the inner and outer band portions includes one outwardly extending tab-like guide hook 12 and two cold-deformed support hooks 13 provided on the inner band portion 11a which are adapted to engage in aperture 15 and slot-like opening 26. The guide and support hooks 12 and 13 may thereby be constructed as disclosed in prior U.S. Pat. No. 4,299,012 whereby the guide hook 12 is a transversely extending tab-like member bent-out from a substantially U-shaped cut in the inner band portion 11a. However, the guide hook 12 may also be a combined guide and support hook as shown in FIGS. 9–12 of the prior U.S. Pat. No. 4,492,004. Moreover, the guide hook 12 may also be in the form of an approximately L-shaped guide and preassembly hook as shown and described in connection with FIGS. 13–18 of the prior U.S. Pat. No. 4,492,004. The approximately L-shaped preassembly hook 12 with a small leg portion 12' (FIG. 5) may be punched-out in such condition from the blank or may receive such shape only after preassembly of the clamp structure by simply bending over at that time the free end of the guide hook 12.

To enable tightening of the clamp structure about an object to be fastened thereby by the use of a tightening tool generally designated by reference numeral 20 and shown only partially in FIG. 3, which may be of conventional construction and which includes mutually facing flat engaging surfaces 21 and 21' at the jaws 22 and 22', the outer and inner band portions 11b and 11a are provided with tool-engaging abutments 24 and 25, respectively, in the form of cold-deformed, pressed-out embossments of partially convexly shaped cross section (FIGS. 7 and 8). The pressed-out tunnel-like tool-engaging embossment 24 in the outer band portion 11b thereby has a convex shape of relatively low height (FIG. 8), as compared to the essentially semi-cylindrical shape in the prior art, with a normal tool-engaging abutment surface 24a and a torque-limiting tool-engaging abutment surface 24b at the opposite end of the tunnel-like embossment 24. The tool-engaging abutment surface 24b thereby serves to prevent over-torquing of the clamp structure, as will be described more fully hereinafter. As also shown in FIG. 8, the convex portion of the tunnel-like embossment 24 passes over into the remaining lateral outer band portions 11b' by concavely shaped, rounded-off transition portions 24' having a suitable radius of curvature, preferably a radius of curvature larger than the radius of curvature of the convexly shaped portion. This construction increases the resistance of the tunnel-like embossment 24 to damage as a result of tearing. The cold-deformed, pressed-out tool-engaging embossment 25 of the inner band portion 11a, in contrast thereto, has only one tool-engaging abutment surface 25a as it is of tapering configuration. More particularly, as can be seen in FIGS. 3–5, the tool-engaging embossment 25 of the inner band portion tapers both in height as also in width in the circumferential direction toward the free end of the inner band portion 11a, whereby the converging side surfaces 25' can be seen in FIG. 4. The tool-engaging embossment 25 is thereby integral with the inner band portion 11a except within the area of its tool-engaging abutment surface 25a pressed-out after a transverse cut in the inner band portion 11a. In transverse cross section (FIG. 7), the tool-engaging embossment 25, like embossment 24, is of convex shape having a relatively low height, with the concavely shaped transition portions 25' into the remaining lateral clamping band portions 11a' being rounded-off with the use of a radius of curvature preferably larger than that of the convexly shaped portion. In one embodiment according to the present invention, the outside maximum height of the tunnel-like tool-engaging embossment in the outer band portion 11b is about 2 millimeters with the maximum outside height of the tool-engaging embossment 25 in the inner band portion being about 1.6 mm. so that the embossment 25 can slide underneath the tunnel-like tool-engaging embossment 24. The particular dimensions are thereby dictated also by the thickness of the band material which may vary in different clamps. The length of the tunnel-like embossment 24 is thereby increased to about 5 mm. while the embossment 25 may be of any appropriate length depending on angle of taper. The lengthening of tunnel-like member 24 and the configuration of embossment 25 resembling a flattened part of a truncated cone as well as their cross-sectional shapes increase significantly the strength thereof against tearing.

To enable a kind of preassembly in the condition of the clamp shown in FIGS. 3 and 4, the guide hook 12 engages with the edge 26' (FIG. 1) of slot-like opening 26 while the next-adjacent support hook 13 engages in aperture 15. The support hook 13 farthest removed from the free end of the inner band portion 11a is thereby located beyond the end of the outer band portion 11b. Tightening is achieved by application of a tightening force with the use of the tightening tool 20 whereby maximum tightening is determined by engagement of the tool surface 21' with both the tool-engaging abutment surfaces 25a and 24b (FIG. 5) in which all the tightening forces are applied in effect against the opposite ends 24a and 24b of tunnel-like embossment 24, thereby preventing further tightening. In this position, the two support hooks 13 are able to engage with surface 26' in slot 26 and with end surface 15' (FIG. 1) in aperture 15 while the slot-like opening 26 is of sufficient length so that the guide hook 12 is able to continue to extend through the slot-like opening 26 though without operable engagement with a transversely extending surface (FIG. 5).

As it becomes increasingly important with thinner and harder plastic hose materials to avoid any step, gap or discontinuity along the inner clamping surface of the clamp structure, the clamp structure in accordance with the present invention is also provided with further means to eliminate any discontinuity or step. These further means which may be as disclosed in the prior U.S. Pat. Nos. 4,299,012 and 4,315,348 may include a tongue-like portion 31 at the free end of the inner band portion 11a which is adapted to engage in a tongue-receiving channel 32 formed in the outer band portion 11b. More specifically, the tongue-receiving channel 32 is formed by two or more longitudinal cuts 34 and 34' defining the centrally located pressed-out central band portion 3 of the tongue-receiving channel 32 which commences within the area of the step-like portions 33 and 33' and terminates within the area of the step-like portion 36. The step-like portions 33 and 33' thereby raise the remaining lateral band portions 34 and 34' to the height of the tongue-receiving channel 32. The tongue-receiving channel 32 may be substantially flat over its length intermediate step-like portions 36 and 33, 33' or may have the shape as shown in FIGS. 3 and 5.

The clamp structure in accordance with the present invention offers numerous advantages.

As mentioned above, by utilizing a lower profile for the tool-engaging embossments 24 and 25, the likelihood of ripping out is considerably reduced because of the reduced leverage for the tool as it engages at abutment surfaces 24a and 25a. The lengthened tunnel-like embossment 24 as also the particular shape of the tapering tool-engaging embossment 25 in the inner band portion 11a provide greater safety against tearing of the parts. By utilizing a heavier steel for the band material in combination with the shape of the relatively low convexly shaped embossments shown in FIGS. 7 and 8 which pass over into the lateral band portions by curved, concavely shaped rounded-off portions, tearing is also minimized.

Additionally, conventional tightening tools such as long-nosed pliers with flat engaging surfaces may be used with the clamp in accordance with the present invention to tighten the same. The ends of the tightening tool can thereby extend into openings 38 and 39 provided therefor in the outer and inner band portions 11b and 11a adjacent the tool-engaging abutment surfaces 24a and 25a to improve the tightening action. These openings 38 and 39, which are of approximately semi-circular shape, have a maximum width in the transverse direction greater than the maximum width of the embossments 24 and 25, as shown in FIGS. 1, 4 and 6, so that the tool's flat engaging surfaces engage not only with the embossments' tool-engaging surfaces 24a and 25a but also with parts of the lateral band portions 11a' and 12a' exposed by these openings 38 and 39. As a result thereof, greater resistance against ripping and tearing is realized by reason of the location of the thus-exposed surfaces in the uninterrupted parts of the clamping band. This further strengthens the clamp against damage possibly caused by tightening forces. The openings 38 and 39 may also be lengthened from a strictly semicircular shape or modified in other ways depending on the particular shape of the tips of the jaws of the tightening tool used.

Furthermore, by utilizing only a number of openings, i.e., the aperture 15 and slot-like opening 26, which is less than the number of the hook-like members adapted to engage with these openings, i.e., the three hook-like members 12, 13, 13, significant amounts of band material can be economized, particularly as these clamps are sold by the millions so that even small savings in band material are significant. This is possible as only two hook-like members engage with the openings in the preassembled and in the fully installed condition of the clamp structure. These savings are further enhanced by the fact that the over-torquing feature of the present invention permits a design which involves small diametric variations between the open and closed position with a typical diametric variation amounting to about 2.2 mm. Again, this results in further saving of band material.

Though the clamp structure in accordance with the present invention can dispense with any preassembly hook structure because of its particular arrangement in the pre-deformed condition, FIGS. 9-12 illustrate a modified embodiment with a snap-in preassembly hook arrangement. FIGS. 9-12 differ from FIGS. 1-6 essentially only by the configuration of the guide hook generally designated by reference numeral 112 which, in this particular case, includes a relatively short, generally outwardly extending leg portion 113 adjoined by a generally circumferentially extending longer leg portion 114 which is provided with a constriction 115, formed by an approximately U-shaped depression in the longer leg portion 114, as viewed in side view. The approximately U-shaped depression 115 thereby extends over substantially the entire width of the hook 112. The snap-in preassembly hook 112, which extends in a circumferential direction away from the free end of the inner band portion 11a, is punched out of the band material itself. The first leg portion 113 may thereby extend radially outwardly from the outer surface of the clamping band or may also extend outwardly at an angle as shown in the drawing. The longer leg portion 114 thereby extends approximately parallel to the outer surface of the clamping band. Openings 115 and 26 are thereby so arranged in the outer band portion 11b that the constriction 115 is spaced from the shorter leg portion a distance at least equal to the spacing in the clamping band between the aperture 15 and the slot-like opening 26. The free end of the approximately U-shaped depression 115 is formed by a leg portion 116 that extends obliquely upwardly and outwardly to form a guide surface for the outer band portion to engage underneath the hook. As to the rest, what was said in connection with the embodiment of FIGS. 1-8 equally applies to the embodiment of FIGS. 9-12.

FIGS. 13 and 14 illustrate a pneumatic tool head with jaw members 122 and 122' accommodating plier-like members 123 and 123' provided with flat engaging surfaces 121 and 121'. The tool housing 61 which accommodates the pneumatic actuating mechanism of conventional construction is adjoined by a base portion 62 for connection with a pressure source whereby member 125 actuates the actuating mechanism that enables the application of air pressure to close plier-like members 123 and 123'. The details of the tool head 61 are otherwise conventional, as used with similar pneumatic tools and for the sake of simplicity are not described in detail herein. Important for the present invention is the fact that openings 38 and 39 in the outer and inner band portions 11b and 11a, respectively, permit the use of a tool with flat-nosed end portions 123a and 123a'.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An open clamp structure with a clamping band means having overlapping inner and outer band portions which are adapted to be mechanically interconnected by the use of at least one hook-like means in one band portion operable to engage in a hook-receiving means in the other band portion, and which includes means enabling tightening of the clamp structure about an object to be fastened thereby, characterized in that the means enabling tightening of the clamp structure includes means for preventing over-torquing of the clamping band means in the presence of continuing tightening forces by positively limiting further relative movement between the inner and outer band portions of the clamp structure.

2. A clamp structure according to claim 1, wherein the means enabling tightening of the clamp structure includes tool-engaging surface means in the inner and outer band portions, characterized in that the tool-engaging surface means are so located in the clamping band means that the clamping band means can be tightened only to a predetermined extent by engagement of a tightening tool at the tool-engaging surface means so as to prevent over-torquing.

3. A clamp structure according to claim 2, characterized in that the tool-engaging surface means are of such shape and location in the clamping band means that they can assume overlapping positions without mutual interference.

4. A clamp structure according to claim 2, characterized in that the outer band portion is provided with a tunnel-like embossment means having tool-engaging abutment surface means at both ends thereof, the tool-engaging abutment surface means of the tunnel-like embossment means further away from the free end of the outer band portion serving for engagement by one jaw of the tightening tool while the oppositely disposed tool-engaging abutment surface means in the tunnel-like embossment means nearer the free end of the outer band portion serves for limiting the tightening force by engagement of the other jaw of the tightening tool normally engaging with the tool-engaging abutment surface means of the inner band portion.

5. A clamp according to claim 4, characterized in that the tool-engaging abutment surface means in the inner band portion is formed by a pressed-out embossment means which tapers in height in the circumferential direction toward the free end of the inner band portion.

6. A clamp structure according to claim 5, characterized in that the embossment means in the inner band portion also tapers in width toward the free end of the inner band portion.

7. A clamp structure according to claim 6, characterized in that the embossment means in the inner band portion is integral with the inner band portion over substantially its entire extent with the exception of its tool-engaging abutment surface means.

8. A clamp structure according to claim 4, characterized in that the embossment means in the outer band portion is of convex shape in transverse cross section with a relatively low profile whose adjoining transition portions pass over into the remaining lateral outer band portions by concavely shaped rounded-off transition portions.

9. A clamp structure according to claim 8, characterized in that the embossment means in the inner band portion is of convex shape in transverse cross section with a relatively low profile whose adjoining transition portions pass over into the remaining lateral inner band portions by concavely shaped rounded-off portions.

10. A clamp structure according to claim 8, characterized in that the embossment means in the inner band portion is of part-convex shape in transverse cross section with a maximum height less than the inner height of the embossment means in the outer band portion so that it can slide underneath the embossment means in the outer band portion during tightening of the clamp structure.

11. A clamp structure according to claim 10, wherein the embossment means in the inner band portion is integral with the inner band portion except within the area of the tool-engaging abutment surface means.

12. A clamp structure according to claim 11, wherein the embossment means in the inner band portion tapers both in height and width in the circumferential direction toward the free end of the inner band portion.

13. A clamp structure according to claim 4, wherein said tunnel-like embossment means in the outer band portion is of relatively increased length to reduce likelihood of ripping and tearing.

14. A clamp structure according to claim 4, characterized in that the inner and outer band portions are provided with openings adjacent their respective tool-engaging abutment surface means so that the tips of the jaws of the tightening tool can extend into these openings.

15. A clamp structure according to claim 14, wherein said openings have a maximum width in the transverse direction greater than the maximum width of the adjacent tool-engaging abutment surface means so that tightening forces can also be applied by the tightening tool against parts of the lateral band portions adjacent the embossment means which are exposed by the openings.

16. A clamp structure according to claim 15, wherein said openings are of approximately semi-circular shape, as viewed in plan view.

17. A clamp structure with at least three hook-like means and with at least two hook-receiving means according to claim 1, wherein the number of hook-receiving means is less than the number of hook-like means, with one hook-receiving means being an elongated slot-like opening so that in the preassembled condition the hook-like means nearest the free end of the inner band portion and the next-adjacent hook-like means are able to operably engage in the slot-like opening and in the next-adjacent hook-receiving means while in the fully installed condition, the next-adjacent hook-like means and the next hook-like means following in the direction toward the free end of the outer band portion are able to operably engage in the slot-like opening and in the next-adjacent hook-receiving means with the first-mentioned hook-like means extending through the slot-like opening without operable engagement with any transverse surface of the slot-like opening.

18. A clamp structure according to claim 17, wherein said first-mentioned hook-like means is a tab-like guide hook pressed out of the inner band portion in accordance with cuts in the inner band portion while the remaining hook-like means are cold-deformed support hooks.

19. A clamp structure according to claim 18, wherein said guide hook is also a preassembly hook.

20. A clamp structure according to claim 19, wherein said preassembly guide hook includes further means providing a snap-in preassembly.

21. A clamp structure according to claim 20, wherein said preassembly hook includes a relatively short, outwardly extending leg portion adjoined by an angular bent, generally circumferentially extending longer leg portion provided with constriction means forming part of said further means.

22. A clamp structure according to claim 21, wherein said constriction means is of V-shape extending substantially over the entire width of the longer leg portion.

23. A clamp structure with at least three hook-like means and with at least two hook-receiving means according to claim 21, wherein the number of hook-receiving means is less than the number of hook-like means, with one hook-receiving means being an elongated slot-like opening so that in the preassembled condition the hook-like means nearest the free end of the inner band portion is able to operably engage in the slot-like opening while in the fully installed condition, the next-adjacent hook-like means and the next hook-like means following in the direction toward the free end of the outer band portion are able to operably engage in the slot-like opening and in the next-adjacent hook-receiving mean with the first-mentioned hook-like means extending through the slot-like opening without operable engagement with any transverse surface of the slot-like opening.

24. A clamp structure according to claim 23, wherein the slot-like opening and the next-adjacent hook-receiving means are so spaced from one another in the circumferential direction that the constriction means is able to engage in the next-adjacent hook-receiving means when the shorter leg portion engages with the transverse edge of the slot-like opening nearer the free end of the outer band portion.

25. A clamp structure according to claim 2, characterized by additional means to assure an internal clamping surface substantially devoid of any step or discontinuity including tongue-like means in the inner band portion and tongue-receiving means in the outer band portion.

26. A clamp structure according to claim 25, characterized in that the tongue-receiving means is located in the circumferential direction relative to the tool-engaging surface means in the outer band portion away from the free end of the outer band portion.

27. A clamp structure according to claim 26, characterized in that the outer band portion includes a step-like portion and in that the tongue-receiving means starts within the area of said step-like portion.

28. A clamp structure according to claim 27, wherein said tongue-receiving means is a pressed-out channel in the central area of the outer band portion which terminates in another step-like portion, whereby the first-mentioned step-like portion raises the remaining lateral outer band portions substantially to the height of the pressed-out channel.

29. A clamp structure according to claim 2, characterized in that the inner and outer band portions are provided with openings adjacent their respective tool-engaging abutment surface means so that the tips of the jaws of the tightening tool can extend into these openings.

30. A clamp structure according to claim 29, wherein said openings have a maximum width in the transverse direction greater than the maximum width of the adjacent tool-engaging abutment surface means so that tightening forces can also be applied by the tightening tool against parts of the lateral band portions adjacent the embossment means which are exposed by the openings.

31. A clamp structure according to claim 30, wherein said openings are of approximately semi-circular shape, as viewed in plan view.

32. A clamp structure according to claim 1, wherein said further means is formed by fixed abutment surface means effectively constituting a positive stop fixed relative to one of the band portions and opposing further tightening of the clamp structure.

33. A clamp structure according to claim 32, wherein said positive stop is formed in one of said inner and outer band portions.

* * * * *